(12) United States Patent
Bae et al.

(10) Patent No.: US 8,055,930 B2
(45) Date of Patent: Nov. 8, 2011

(54) INTERNAL CLOCK SIGNAL GENERATING CIRCUITS INCLUDING FREQUENCY DIVISION AND PHASE CONTROL AND RELATED METHODS, SYSTEMS, AND DEVICES

(75) Inventors: Seungjun Bae, Daejeon-si (KR); JinGook Kim, Gyeonggi-do (KR); Kwangil Park, Gyeonggi-do (KR); Daehyun Chung, Daejeon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 556 days.

(21) Appl. No.: 12/198,245

(22) Filed: Aug. 26, 2008

(65) Prior Publication Data

US 2009/0100285 A1   Apr. 16, 2009

(30) Foreign Application Priority Data

Oct. 11, 2007 (KR) ........................ 10-2007-0102641

(51) Int. Cl.
*G06F 1/00* (2006.01)
*G06F 1/04* (2006.01)
*H03L 7/00* (2006.01)

(52) U.S. Cl. ........ 713/400; 713/501; 713/503; 327/144; 327/152

(58) Field of Classification Search .......... 713/400–401, 713/501, 503, 600; 710/305; 327/141, 144, 327/145–146, 149, 152, 153, 155, 158, 161, 327/163; 375/354–355, 362, 371, 375
See application file for complete search history.

(56) References Cited

U.S. PATENT DOCUMENTS 4,242,741 A   12/1980 Parrish
(Continued)

FOREIGN PATENT DOCUMENTS

JP   H8-287199   11/1996
(Continued)

OTHER PUBLICATIONS

JEDEC Standard, DDR2 SDRAM Specification, JESD79-2B, Revision of JESD79-2A, JEDEC Solid State Technology Association, Jan. 2005, pp. 1-103.
(Continued)

*Primary Examiner* — Thomas J Cleary
(74) *Attorney, Agent, or Firm* — Myers Bigel Sibley & Sajovec, P.A.

(57) ABSTRACT

An integrated circuit device may include a main clock signal input pad configured to receive a main clock signal having a main clock frequency, a high speed clock signal input pad configured to receive a high speed clock signal having a high speed clock frequency greater than the main clock frequency, a frequency divider, and a phase controller. The frequency divider may be configured to generate a plurality of preliminary internal clock signals responsive to the high speed clock signal wherein each of the preliminary internal clock signals has the same main clock frequency and a different phase. The phase controller may be configured to select one of the preliminary internal clock signals having a phase most closely matched with a phase of the main clock signal, and to translate the preliminary internal clock signals to internal clock signals so that the preliminary internal clock signal having the phase most closely matched with the phase of the main clock signal is translated as a primary internal clock signal, so that the internal clock signals have the main clock frequency. Related methods, systems, and devices are also discussed.

23 Claims, 11 Drawing Sheets

U.S. PATENT DOCUMENTS

| | | | |
|---|---|---|---|
| 5,485,490 A * | 1/1996 | Leung et al. | 375/371 |
| 6,003,118 A | 12/1999 | Chen | |
| 6,078,514 A | 6/2000 | Takemae et al. | |
| 6,201,442 B1 | 3/2001 | James et al. | |
| 6,327,217 B1 | 12/2001 | Chung | |
| 6,411,161 B1 | 6/2002 | Yamamoto | |
| 6,728,162 B2 | 4/2004 | Lee et al. | |
| 6,792,003 B1 * | 9/2004 | Potluri et al. | 370/476 |
| 6,909,643 B2 | 6/2005 | Kwean | |
| 7,391,255 B2 | 6/2008 | Matsuzaki | |
| 7,778,097 B2 | 8/2010 | Chung et al. | |
| 2002/0001360 A1 | 1/2002 | Park et al. | |
| 2002/0093871 A1 | 7/2002 | Kwak | |
| 2002/0174373 A1 | 11/2002 | Chang | |
| 2003/0128597 A1 | 7/2003 | Jun et al. | |
| 2005/0052210 A1 * | 3/2005 | Johnson | 327/257 |
| 2005/0240718 A1 | 10/2005 | Chung et al. | |
| 2006/0017479 A1 * | 1/2006 | Kim | 327/158 |
| 2007/0002644 A1 | 1/2007 | Kang | |
| 2007/0057714 A1 * | 3/2007 | Holzle | 327/231 |
| 2007/0064776 A1 * | 3/2007 | Feller et al. | 375/149 |
| 2007/0146375 A1 | 6/2007 | Kang | |
| 2008/0089167 A1 | 4/2008 | Dono | |
| 2008/0126566 A1 * | 5/2008 | Baumgartner et al. | 709/248 |
| 2008/0143404 A1 * | 6/2008 | Shim | 327/158 |
| 2009/0100285 A1 | 4/2009 | Bae et al. | |
| 2010/0090732 A1 * | 4/2010 | Lee et al. | 327/156 |

FOREIGN PATENT DOCUMENTS

| | | |
|---|---|---|
| JP | 2002-352583 | 12/2002 |
| KR | 10-1999-0049424 | 7/1999 |
| KR | 2000-0009138 | 2/2000 |
| KR | 1020020086197 A | 11/2002 |
| KR | 1020040095916 A | 11/2004 |
| KR | 1020070002803 A | 1/2007 |

OTHER PUBLICATIONS

Preliminary publication of JEDEC Semiconductor Memory Standard, GDDR4 SGRAM Specification, Feb. 2006, pp. 4-76.

Menolfi et al. "A 16Gb/s Source-Series Terminated Tranmitter in 65nm SOI", IBM Research GmbH, Zurich Research Laboratory, Ruschlikon, Switzerland, IEEE International Solid-State Circuits Conference 2007, 24 pages.

* cited by examiner

INTERNAL CLOCK SIGNAL GENERATING CIRCUITS INCLUDING FREQUENCY DIVISION AND PHASE CONTROL AND RELATED METHODS, SYSTEMS, AND DEVICES

RELATED APPLICATIONS

This U.S. non-provisional patent application claims the benefit of priority under 35 U.S.C. §119 of Korean Patent Application No. 2007-0102641, filed on Oct. 11, 2007, the disclosure of which is hereby incorporated herein by reference in its entirety.

FIELD OF THE INVENTION

The present invention generally relates to electronic memories, and more particularly, to generation of clock signals for electronic memory devices and related devices, systems, and methods.

BACKGROUND

In order to increase speeds of memory operations, Double Data Rate (DDR) Dynamic Random Access Memory (DRAM) devices (also referred to as DDR memory devices), have been developed so that data is written to and/or read from the memory device on both rising and falling edges of a main clock signal. In known DDR memory devices, both the main clock signal and a high speed clock signal (having a frequency that is twice a frequency of the main clock signal) may be provided from a memory controller to the DDR memory device.

A DDR memory device (such as a DDR2 memory device for a personal computer or server) may operate at a main frequency of about 400 MHz to provide a data rate of about 800 Mbps. A GDDR (Graphics DDR) memory device (such as a GDDR4 memory device for a graphics card) may operate at a main clock frequency of about 1.25 GHz to provide a data rate of about 2.5 GHz. Moreover, even faster GDDR memory devices (such as a GDDR5 memory device) are proposed to operate, for example, at a main clock frequency of about 2.5 GHz to provide a data rate of about 5 GHz.

In a DDR memory device, the main clock signal (transmitted from the memory controller to the DDR memory device) is used to synchronize transmission of command (CMD) and address (ADD) signals transmitted from the memory controller to the DDR memory device. The high speed clock signal may be generated at the memory controller to have a frequency that is twice the frequency of the main clock signal, and the high speed clock signal may be free running. Moreover, data being written to and/or read from the DDR memory device may be aligned with the high speed clock signal to provide the double data rate.

In a DDR memory device using both a main clock signal and a high speed clock signal, the high speed clock signal may need to be synchronized with the main clock signal to provide proper timing of command, address, and data signals during read and/or write operations. For example, a tuning operation may be used to provide that a rising edge of the main clock signal is aligned with a rising edge of the high speed clock signal (as opposed to a falling edge of the high speed clock signal). More particularly, the high speed clock signal (HSCS) may be divided by 2 to provide a HSCS/2 signal. The HSCS/2 signal may then be compared and aligned with a phase of the main clock signal and tuned so that rising edges of the HSCS/2 signal are aligned with rising edges of the main clock signal. By tuning the HSCH/2 signal, rising edges of the main clock signal may be aligned with rising edges of the high speed clock signal.

Alignment of main and high speed clock signals may be provided in a DDR memory using data training. More particularly, a known data pattern may be written from the controller to a FIFO (First-In-First-Out) buffer of the DDR memory device (not DRAM memory cells). A series of read operations are then performed using different phases of the high speed clock signal to read the known data pattern from the FIFO buffer of the DDR memory device. The phase of the high speed clock signal providing the best performance (e.g., providing a successful read of known data pattern) may then be selected for subsequent read operations. If multiple phases of the high speed clock provide a successful read of the known data pattern, a center one of the passing phases of the high speed clock signal may be selected.

Data training operations, however, may consume time and/or power. Moreover, a frequency divider(s) within a DDR memory may be used to divide the high speed clock signal for internal operation, but an initial value of the frequency divider may be unknown, and the output of the frequency divider may be inverted relative to a desired output. Accordingly, if a clock and/or frequency divider stops after power up (e.g., in a power down mode) with data already aligned, a frequency divider output may be inverted so that another data training operation may be required.

SUMMARY

According to some embodiments of the present invention, an integrated circuit device may include a main clock signal input pad configured to receive a main clock signal having a main clock frequency, a high speed clock signal input pad configured to receive a high speed clock signal having a high speed clock frequency greater than the main clock frequency, a frequency divider, and a phase controller. The frequency divider may be configured to generate a plurality of preliminary internal clock signals responsive to the high speed clock signal wherein each of the preliminary internal clock signals has the same main clock frequency and a different phase. The phase controller may be configured to select one of the preliminary internal clock signals having a phase most closely matched with a phase of the main clock signal, and to translate the preliminary internal clock signals to internal clock signals so that the preliminary internal clock signal having the phase most closely matched with the phase of the main clock signal is translated as a primary internal clock signal and so that the internal clock signals have the main clock frequency.

The primary internal clock signal may have a primary phase, and non-primary ones of the internal clock signals may have different phases that are delayed relative to the primary phase. In addition, a memory cell array may include a plurality of memory cells, and a plurality of data input/output buffers may be coupled between respective data input/output pads and the memory cell array. Moreover, each of the data input/output buffers may be configured to write and/or read data to and/or from the memory cell array responsive to the plurality of internal clock signals. In addition, the high speed clock frequency may be $2^n$ times greater than the main clock frequency where n is a positive integer number.

The frequency divider may include first and second flip-flops each having a data input, a clock input, and inverted and non-inverted outputs. The first flip-flop may be configured to receive the high speed clock signal at the clock input and to feed the inverted data output back to the data input. The second flip-flop may be configured to receive the high speed clock signal at the inverted clock input and to feed the inverted data output back to the data input, and the preliminary internal clock signals may be generated at the inverted and non-inverted data outputs of the first and second flip-flops.

The frequency divider may be configured to generate $2^m$ preliminary internal clock signals. Each of the $2^m$ preliminary internal clock signals may have the same main clock frequency and a different phase, and a difference between a phase of each of the $2^m$ preliminary internal clock signals and a phase of any other of the $2^m$ preliminary internal clock signals may be at least $\frac{1}{2}^m$ of a period of the main clock frequency.

The phase controller may include a phase selector and a phase corrector. The phase selector may be configured to generate a phase selection output responsive to combining one of the preliminary internal clock signals and the main clock signal. The phase corrector may be configured to translate the preliminary internal clock signals to the internal clock signals responsive to the phase selection output.

The phase selector may be configured to generate the phase selection output having one of first and second binary values. The phase corrector may be configured to translate a first one of the preliminary internal clock signals as the primary internal clock signal responsive to the phase selection output having the first binary value. The phase corrector may be configured to translate a second one of the preliminary internal clock signals as the primary internal clock signal responsive to the phase selection output having the second binary value. Moreover, the second preliminary internal clock signal may be an inverse of the first preliminary internal clock signal.

The phase selector may be configured to generate the phase selection output by comparing a phase of the one of the preliminary internal clock signals and the main clock signal. The phase corrector may be configured to translate a first one of the preliminary internal clock signals or a second one of the preliminary internal clock signals as the primary internal clock signal responsive to the phase selection output. The second one of the preliminary internal clock signals may be an inverse of the first one of the preliminary internal clock signals.

The phase selector may include a flip-flop having a data input configured to receive the main clock signal and a clock input configured to receive the one of the preliminary internal clock signals, and the phase selection output may be generated at an output of the flip-flop. The phase selector may include a flip-flop having a clock input configured to receive the main clock signal and a data input configured to receive the one of the preliminary internal clock signals, and the phase selection output may be generated at an output of the flip-flop.

The phase selector may be configured to generate the phase selection output having one of first and second binary values, and the phase corrector may be configured to translate the preliminary internal clock signals to the internal clock signals according to a first translation pattern and to translate the preliminary internal clock signals to the internal clock signals according to a second translation pattern different than the first translation pattern. The phase corrector may include a plurality of complementary switch pairs with each complimentary switch pair being coupled to a respective one of the preliminary internal clock signals so that each preliminary input clock signal is translated as one of two different internal clock signals responsive to the phase selection output.

A phase detector may be configured to generate a phase error signal responsive to one of the internal clock signals and the main clock signal and to transmit the phase error signal to a memory controller outside the integrated circuit device. The high speed clock frequency may be 4 times higher than the main clock frequency, and the frequency divider may be configured to generate 8 preliminary internal clock signals with each of the 8 preliminary internal clock signals having the same main clock frequency and a different phase.

According to other embodiments of the present invention, an integrated circuit device may include a main clock signal input pad configured to receive a main clock signal having a main clock frequency, a high speed clock signal input pad configured to receive a high speed clock signal having a high speed clock frequency greater than the main clock frequency, a frequency divider, and a phase selector, and a phase corrector. The frequency divider may be configured to generate a plurality of preliminary internal clock signals responsive to the high speed clock signal, and each of the preliminary internal clock signals may have the same main clock frequency and a different phase. The phase selector may be configured to generate a phase selection output responsive to combining one of the preliminary internal clock signals and the main clock signal. The phase corrector may be configured to translate the preliminary internal clock signals to internal clock signals responsive to the phase selection output.

The phase selector may be configured to generate the phase selection output having one of first and second binary values. The phase corrector may be configured to translate a first one of the preliminary internal clock signals as the primary internal clock signal responsive to the phase selection output having the first binary value. The phase corrector may be configured to translate a second one of the preliminary internal clock signals as the primary internal clock signal responsive to the phase selection output having the second binary value. Moreover, the second preliminary internal clock signal may be an inverse of the first preliminary internal clock signal.

The phase selector may be configured to generate the phase selection output by comparing a phase of the one of the preliminary internal clock signals and the main clock signal. The phase corrector may be configured to translate a first one of the preliminary internal clock signals or a second one of the preliminary internal clock signals as the primary internal clock signal responsive to the phase selection output. The second one of the preliminary internal clock signals may be an inverse of the first one of the preliminary internal clock signals.

The phase selector may include a flip-flop having a data input configured to receive the main clock signal and a clock input configured to receive the one of the preliminary internal clock signals, and the phase selection output may be generated at an output of the flip-flop. The phase selector may include a flip-flop having a clock input configured to receive the main clock signal and a data input configured to receive the one of the preliminary internal clock signals, and the phase selection output may be generated at an output of the flip-flop.

The phase selector may be configured to generate the phase selection output having one of first and second binary values, and the phase corrector may be configured to translate the preliminary internal clock signals to the internal clock signals according to a first translation pattern and to translate the preliminary internal clock signals to the internal clock signals according to a second translation pattern different than the first translation pattern. The phase corrector may include a plurality of complementary switch pairs with each complimentary switch pair being coupled to a respective one of the preliminary internal clock signals so that each preliminary input clock signal is translated as one of two different internal clock signals responsive to the phase selection output.

A memory cell array may include a plurality of memory cells, and a plurality of data input/output buffers may be coupled between respective data input/output pads and the memory cell array. Moreover, each of the data input/output buffers may be configured to write and/or read data to and/or from the memory cell array responsive to the plurality of internal clock signals.

The high speed clock frequency may be $2^n$ times greater than the main clock frequency where n is a positive integer number. Moreover, the frequency divider may include first and second flip-flops having respective data inputs, clock inputs, and inverted and non-inverted outputs. The first flip-flop may be configured to receive the high speed clock signal at the clock input and to feed the inverted data output back to the data input. The second flip-flop may be configured to receive the high speed clock signal at the inverted clock input and to feed the inverted data output back to the data input. The preliminary internal clock signals may be generated at the inverted and non-inverted data outputs of the first and second flip-flops.

The frequency divider may be configured to generate $2^m$ preliminary internal clock signals with each of the $2^m$ preliminary internal clock signals having the same main clock frequency and a different phase. Moreover, a difference between a phase of each of the $2^m$ preliminary internal clock signals and a phase of any other of the $2^m$ preliminary internal clock signals may be at least $\frac{1}{2}^m$ of a period of the main clock frequency. A phase detector may be configured to generate a phase error signal responsive to one of the internal clock signals and the main clock signal and to transmit the phase error signal to a memory controller outside the integrated circuit device. The high speed clock frequency may be 4 times higher than the main clock frequency, and the frequency divider may be configured to generate 8 preliminary internal clock signals with each of the 8 preliminary internal clock signals having the same main clock frequency and a different phase.

According to still other embodiments of the present invention, a memory system may include a memory controller and an integrated circuit memory device coupled to the memory controller. The memory controller may be configured to generate a main clock signal having a main clock frequency and a high speed clock signal having a high speed clock frequency greater than the main clock frequency. The integrated circuit memory device may include a main clock signal input pad, a high speed clock signal input pad, a memory cell array including a plurality of memory cells, a plurality of data input/output buffers, a frequency divider, and a phase controller. The main clock signal input pad may be configured to receive the main clock signal from the memory controller, and the high speed clock signal input pad may be configured to receive the high speed clock signal from the memory controller. The plurality of data input/output buffers may be coupled between respective data input/output pads and the memory cell array, and each of the data input/output buffers may be configured to write and/or read data to and/or from the memory cell array responsive to a plurality of internal clock signals. Each of the internal clock signals may have the main clock frequency, and a primary one of the internal clock signals may have a primary phase. Non-primary ones of the internal clock signals may have different phases that are delayed relative to the primary phase. The frequency divider may be configured to generate a plurality of preliminary internal clock signals responsive to the high speed clock signal, and each of the preliminary internal clock signals may have the same main clock frequency and a different phase. The phase controller may be configured to select one of the preliminary internal clock signals having a phase most closely matched with a phase of the main clock signal, and may be configured to translate the preliminary internal clock signals to the internal clock signals so that the preliminary internal clock signal having the phase most closely matched with the phase of the main clock signal is translated as the primary internal clock signal.

The integrated circuit memory device may also include a phase detector configured to generate a phase error signal responsive to one of the internal clock signals and the main clock signal and to transmit the phase error signal to the memory controller. Moreover, the high speed clock frequency may be 4 times higher than the main clock frequency, and the frequency divider may be configured to generate 8 preliminary internal clock signals with each of the 8 preliminary internal clock signals having the same main clock frequency and a different phase. The memory controller may also include a synchronization circuit configured to synchronize the high speed clock responsive to the phase error signal generated by the phase detector.

According to still other embodiments of the present invention, a memory system may include a memory controller and an integrated circuit memory device coupled to the memory controller. The memory controller may be configured to generate a main clock signal having a main clock frequency and a high speed clock signal having a high speed clock frequency at least two times greater than the main clock frequency. The integrated circuit memory device may include a main clock signal input pad, a high speed clock signal input pad, a memory cell array including a plurality of memory cells, a plurality of data input/output buffers, a frequency divider, a phase selector, and a phase corrector. The main clock signal input pad may be configured to receive the main clock signal from the memory controller, and the high speed clock signal input pad may be configured to receive the high speed clock signal from the memory controller. The plurality of data input/output buffers may be coupled between respective data input/output pads and the memory cell array, and each of the data input/output buffers may be configured to write and/or read data to and/or from the memory cell array responsive to a plurality of internal clock signals. Each of the internal clock signals may have the main clock frequency, a primary one of the internal clock signals may have a primary phase, and non-primary ones of the internal clock signals may have different phases that are delayed relative to the primary phase. The frequency divider may be configured to generate a plurality of preliminary internal clock signals responsive to the high speed clock signal, and each of the preliminary internal clock signals may have the same main clock frequency and a different phase. The phase selector may be configured to generate a phase selection output responsive to combining one of the preliminary internal clock signals and the main clock signal, and the phase corrector may be configured to translate the preliminary internal clock signals to the internal clock signals responsive to the phase selection output.

The integrated circuit memory device may also include a phase detector configured to generate a phase error signal responsive to one of the internal clock signals and the main clock signal and to transmit the phase error signal to the memory controller. The memory controller may also include a synchronization circuit configured to synchronize the high speed clock responsive to the phase error signal generated by the phase detector.

According to yet other embodiments of the present invention, a method of operating an integrated circuit device may include receiving a main clock signal having a main clock frequency, and receiving a high speed clock signal having a high speed clock frequency greater than the main clock frequency. A plurality of preliminary internal clock signals may be generated responsive to the high speed clock signal with each of the preliminary internal clock signals having the same main clock frequency and a different phase. One of the preliminary internal clock signals having a phase most closely matched with a phase of the main clock signal may be selected, and the preliminary internal clock signals may be translated to internal clock signals so that the preliminary internal clock signal having the phase most closely matched with the phase of the main clock signal is translated as a primary internal clock signal.

The internal clock signals may have the main clock frequency, the primary internal clock signal may have a primary phase, and non-primary ones of the internal clock signals may have different phases that are delayed relative to the primary phase. Selecting one of the preliminary internal clock signals may include comparing the main clock signal and one of the preliminary internal clock signals to generate a phase selection output, and selecting one of the preliminary internal clock signals responsive to the phase selection output. The internal clock signals may have the main clock frequency, the primary internal clock signal may have a primary phase, and non-primary ones of the internal clock signals may have different phases that are delayed relative to the primary phase.

The integrated circuit device may include a memory cell array having a plurality of memory cells and a plurality of data input/output buffers coupled between respective data input/output pads and the memory cell array. In addition, data may be transferred between the plurality of data input/output buffers and the memory cell array responsive to the internal clock signals. Moreover, the high speed clock frequency may be 4 times higher than the main clock frequency, and generating the plurality of preliminary internal clock signals may include generating 8 preliminary internal clock signals with each of the 8 preliminary internal clock signals having the same main clock frequency and a different phase.

According to more embodiments of the present invention, a method of operating an integrated circuit device may include receiving a main clock signal having a main clock frequency, and receiving a high speed clock signal having a high speed clock frequency greater than the main clock frequency. A plurality of preliminary internal clock signals may be generated responsive to the high speed clock signal with each of the preliminary internal clock signals having the same main clock frequency and a different phase. A phase selection output may be generated responsive to combining one of the preliminary internal clock signals and the main clock signal; and the preliminary internal clock signals may be translated to internal clock signals responsive to the phase selection output.

The integrated circuit device may include a memory cell array having a plurality of memory cells and a plurality of data input/output buffers coupled between respective data input/output pads and the memory cell array. In addition, data may be transferred between the plurality of data input/output buffers and the memory cell array responsive to the internal clock signals. The high speed clock frequency may be 4 times higher than the main clock frequency, and generating the plurality of preliminary internal clock signals may include generating 8 preliminary internal clock signals with each of the 8 preliminary internal clock signals having the same main clock frequency and a different phase.

DETAILED DESCRIPTION

Figure 1:
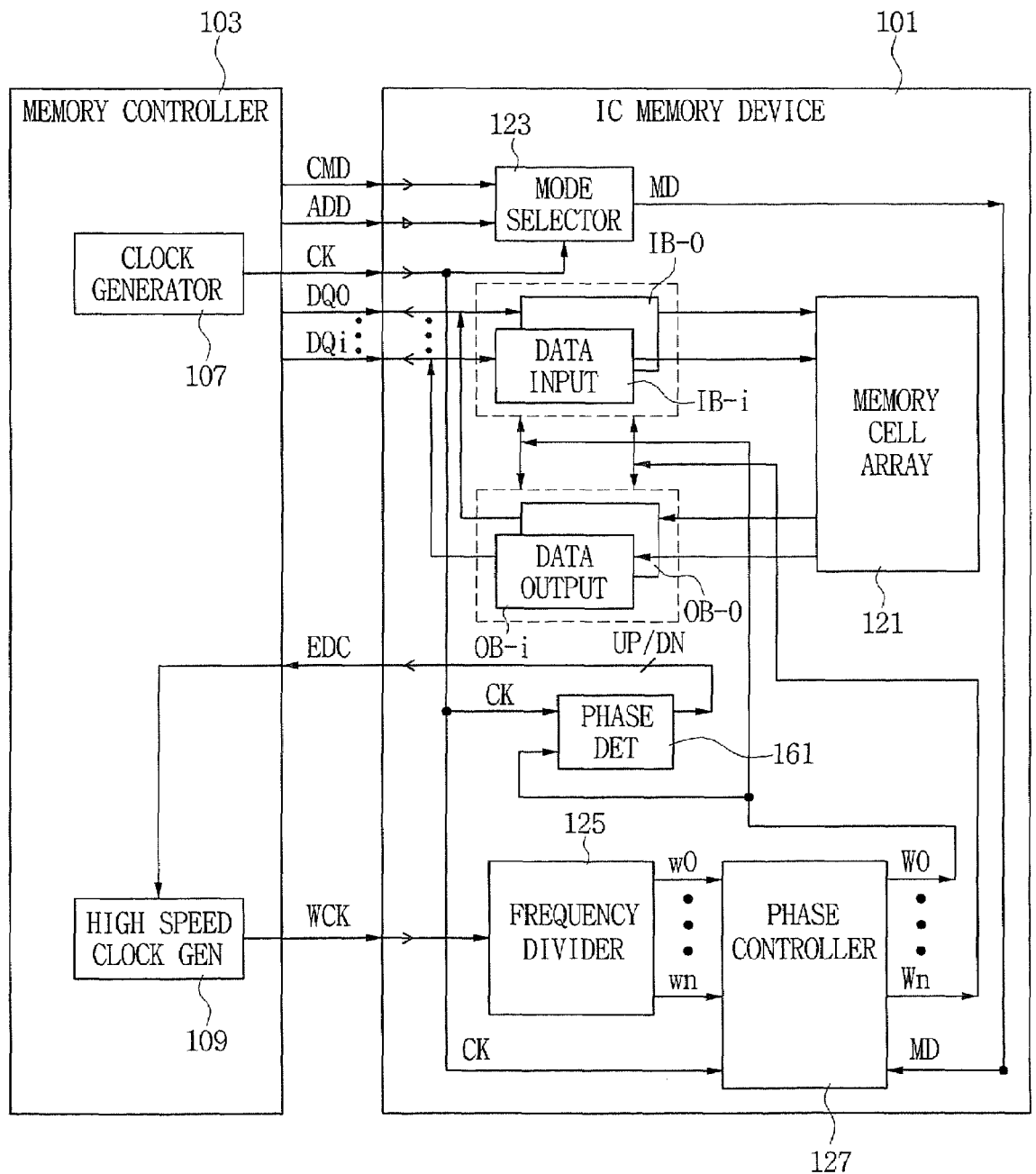
FIG. 1 is a block diagram illustrating a memory system including an integrated circuit memory device and a memory controller according to some embodiments of the present invention.

The present invention is described more fully hereinafter with reference to the accompanying drawings, in which embodiments of the present invention are shown. This invention may, however, be embodied in many different forms and should not be construed as limited to the embodiments set forth herein. Rather, these embodiments are provided so that this disclosure will be thorough and complete, and will fully convey the scope of the present invention to those skilled in the art. Like numbers refer to like elements throughout.

It will be understood that when an element or layer is referred to as being "on", "connected to" or "coupled to" another element or layer, it can be directly on, connected or coupled to the other element, or layer or intervening elements or layers may be present. In contrast, when an element is referred to as being "directly on," "directly connected to" or "directly coupled to" another element or layer, there are no intervening elements or layers present. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly. Also, as used herein, "lateral" refers to a direction that is substantially orthogonal to a vertical direction.

The terminology used herein is for the purpose of describing particular embodiments only, and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. Accordingly, these terms can include equivalent terms that are created after such time. It will be further understood that terms, such as those defined in commonly used dictionaries, should be interpreted as having a meaning that is consistent with their meaning in the present specification and in the context of the relevant art, and will not be interpreted in an idealized or overly formal sense unless expressly so defined herein. All publications, patent applications, patents, and other references mentioned herein are incorporated by reference in their entirety.

FIG. 1 is a block diagram illustrating a memory system 105 including an integrated circuit (IC) memory device 101 and a memory controller 103 according to some embodiments of the present invention. The memory controller 103 may transmit command CMD and address ADD information to the memory device 101 over respective command and address lines, and the memory controller 103 may include a main clock signal generator 107 configured to generate a main clock signal CK used to synchronize transmission of the command CMD and address ADD information to the memory device 101. More particularly, the command information CMD may be used to designate a memory operation (e.g., a read or a write operation) to be performed, and the address information may be used to designate a memory address(es) of the memory device 101 to which data is to be written and/or from which data is to be read.

Moreover, the high speed clock generator 109 may be configured to generate a high speed clock signal WCK having a frequency higher than a frequency of the main clock signal CK. In a double data rate (DDR) memory system, for example, the high speed clock signal WCK may have a frequency that is two times greater than a frequency of the main clock signal CK. The high speed clock signal WCK, however, may be provided at other multiples of the main clock signal CK frequency. In a quad data rate memory system, for example, the high speed clock signal WCK may have a frequency that is four times greater than a frequency of the main clock signal CK.

As further shown in FIG. 1, the memory device 101 may include a memory cell array 121 including a plurality of memory cells. For example, the memory device 101 may be a dynamic random access memory (DRAM) device so that the memory cell array 121 includes a plurality of rows and columns of DRAM memory cells, with each DRAM memory cell including a memory cell capacitor and a memory cell access transistor. The memory cell array 121 may also include word lines, bit lines, sense amplifiers, row decoders, column decoders, etc. The memory device 101, for example, may be a Graphics Double Data Rate 4 (GDDR4) Synchronous Graphics Random Access Memory (SGRAM) or a Double Data Rate 2 (DDR2) Synchronous Dynamic Ransom Access Memory (SDRAM).

The memory device 101 may also include data input/output pads coupled between data input/output lines and data input/output buffers IB-0 to IB-i and OB-0 to IB-i configured to receive/transmit data bits DQ0 to DQi from/to memory controller 103. Each data input buffer IB-0 to IB-i may thus be configured to write a burst of data bits to the memory cell array 121 responsive to internal clock signals W0 to Wn during one cycle of the main clock signal CK. More particularly, a number of data bits in a burst received from memory controller 103 and written by an input buffer IB during one cycle of the main clock signal CK may be equal to the number of different internal clock signals W0 to Wn. Similarly, each data output buffer OB-0 to OB-i may be configured to read a burst of data bits from the memory cell array 121 responsive to internal clock signals W0 to Wn during one cycle of the main clock signal CK. A number of data bits in a burst read by an output buffer OB (and transmitted to memory controller 103) during one cycle of the main clock signal CK may be equal to the number of different internal clock signals W0 to Wn.

A mode selector 123 of the memory device 101 may be configured to receive the command CMD and address ADD information and the main clock signal CK from the memory controller 103 through respective input pads. Moreover, the mode selector 123 may be configured to determine a mode of operation for the memory device 101 responsive to received command CMD and address ADD information. If the memory device 101 supports Mode Register Set (MRS) operations, the mode selector 123 may generate a MRS enable/disable signal MD to indicate when MRS operations are enabled or disabled.

The internal clock signals W0 to Wn may be generated responsive to the high speed clock signal WCK using frequency divider 125 and phase controller 127. Frequency divider 125 may be configured to receive the high speed clock signal WCK through a respective input pad, and frequency divider 125 may be configured to generate a plurality of preliminary internal clock signals w0 to wn responsive to the high speed clock signal WCK with each of the preliminary internal clock signals w0 to wn having the same main clock frequency and a different phase. A frequency of the high speed clock WCK may be $2^k$ (where k is positive integer number) times greater than a frequency of the main clock signal, and a number of preliminary internal clocks signals w0 to wn may be $2^{k+1}$. If the high speed clock signal WCK has a frequency that is 2 times a frequency of the main clock signal (i.e., k=1), for example, the frequency generator will generate four preliminary internal clock signals (e.g., w0, w90, w180, and w270) to support a 4 bit data burst over each data line during one cycle of the main clock signal CK during read and/or write operations. If the high speed clock signal WCK has a frequency that is 4 times a frequency of the main clock signal (i.e., k=2), the frequency generator will generate eight preliminary internal clock signals (e.g., w0, w45, w90, w135, w180, w225, w270, and w315) to support an 8 bit data burst over each data line during one cycle of the main clock signal CK during read and/or write operations.

More particularly, frequency divider 125 may be configured to generate $2^{k+1}$ preliminary internal clock signals having the main clock frequency, and a difference between a phase of each of the preliminary internal clock signals and any other of the preliminary internal clock signals may be at least $\frac{1}{2}^{k+1}$ of a period of the main clock frequency. If a frequency of the high speed clock signal is twice the frequency of the main clock signal so that k=1, frequency divider 125 will generate four preliminary internal clock signals having the main clock frequency with a first having a relative phase shift of 0, with a second having a relative phase shift of ¼ of a period of the main clock frequency, with a third having a relative phase shift of ½ of the main clock frequency, and with a fourth having a relative phase shift of ¾ of the main clock frequency. If a frequency of the high speed clock signal is four times the frequency of the main clock signal so that k=2, frequency divider 125 will generate eight preliminary internal clock signals having the main clock frequency with a first having a relative phase shift of 0, with a second having a relative phase shift of ⅛ of a period of the main clock frequency, with a third having a relative phase shift of ¼ of a period of the main clock frequency, with a fourth having a relative phase shift of ⅜ of a period of the main clock frequency, with a fifth having a relative phase shift of ½ of the period of the main clock frequency, with a sixth having a relative phase shift of ⅝ of a period of the main clock frequency, with a seventh having a relative phase shift of ¾ of a period of the main clock frequency, and with an eighth having a relative phase shift of ⅞ of a period of the main clock frequency.

Phase controller 127 may be configured to select one of the preliminary internal clock signals w0 to wn having a phase most closely matched with a phase of the main clock signal CK. Phase controller 127 may be further configured to translate the preliminary internal clock signals w0 to wn to internal clock signals W0 to Wn so that the preliminary internal clock signal having the phase most closely matched with the phase of the main clock signal CK is translated as a primary internal clock signal W0. Each of the internal clock signals W0 to Wn may thus have the same main clock frequency and a different phase. More particularly, the primary internal clock signal W0 may have a primary phase and each of the non-primary internal clock signals W1 to Wn may have respective phases that are delayed relative to the primary phase.

Figure 2:
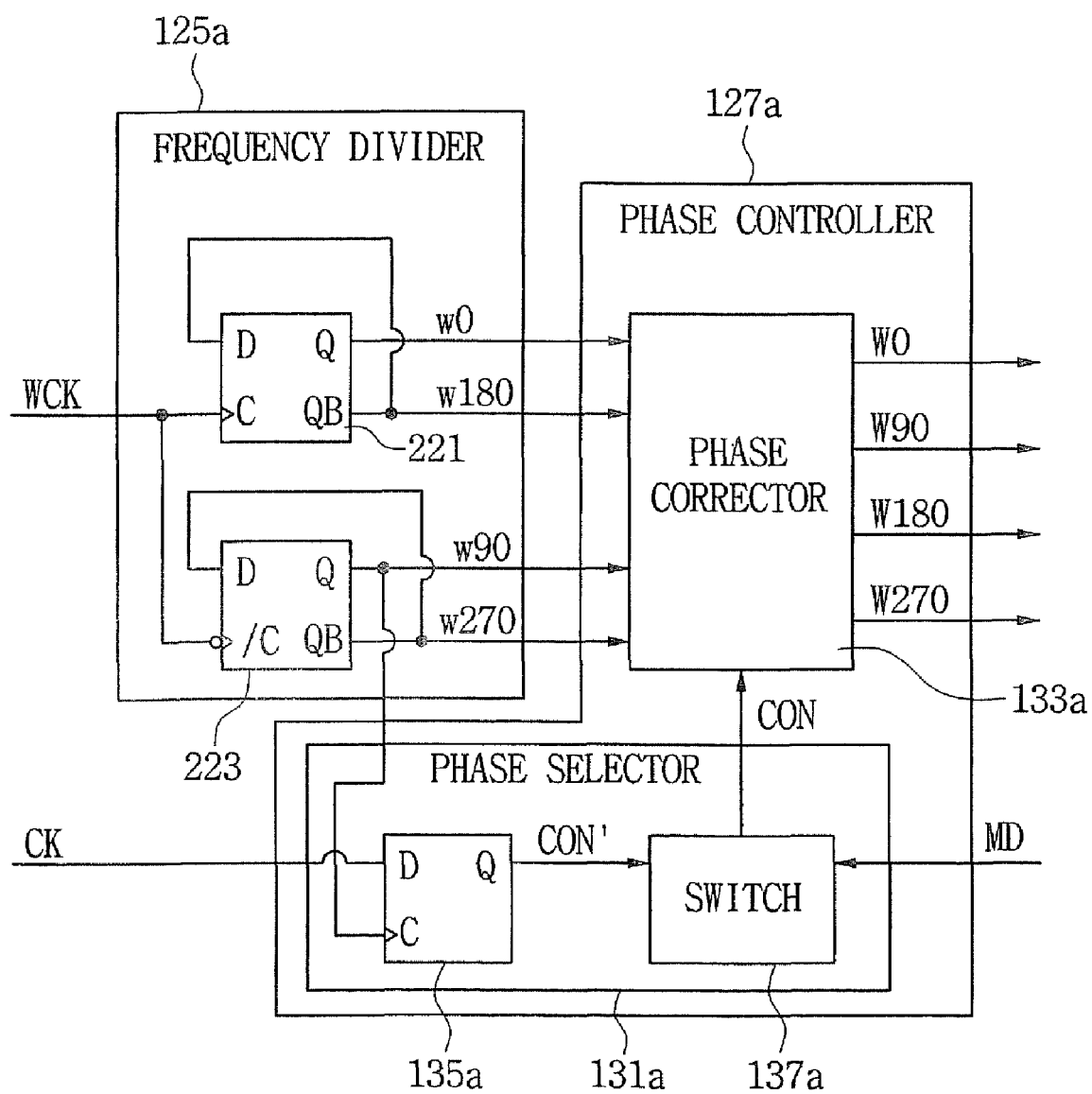
FIG. 2 is a schematic diagram illustrating a frequency divider and a phase controller according to some embodiments of the present invention.

FIG. 2 is a schematic diagram illustrating a frequency divider 125a and a phase controller 127a that may be used for the frequency divider 125 and phase controller 127 of FIG. 1 according to some embodiments of the present invention. As shown in FIG. 2, the frequency divider 125a may include first and second flip-flops 221 and 223.

The first flip-flop 221 may include a data input D, a clock input C, and inverted and non-inverted data outputs Q and QB. More particularly, the first flip-flop 221 may be configured to receive the high speed clock signal WCK at the clock input C and to feed the inverted data output QB back to the data input D. The second flip-flop 223 may have a data input D, an inverted clock input/C, and inverted and non-inverted data outputs Q and QB. The second flip-flop 223 may be configured to receive the high speed clock signal WCK at the inverted clock input/C and to feed the inverted data output QB back to the data input D. Four preliminary internal clock signals w0, w180, w90, and w270 may thus be generated at the non-inverted and inverted outputs of the flip-flops 221 and 223.

With the frequency divider 125a of FIG. 2, the high speed clock signal WCK may have a frequency that is two times greater than a frequency of the main clock signal CK, and the preliminary internal clock signals may provide respective phase shifts (relative to the main clock signal CK) of about 0 degrees (substantially aligned with the main clock signal), 90 degrees (with a phase delay of about ¼ of a period of the main clock signal), 180 degrees (with a phase delay of about ½ of a period of the main clock signal), and 270 degrees (with a phase delay of about ¾ of a period of the main clock signal).

More particularly, the flip-flop 221 may generate preliminary internal clock signals w0 and w180 that are substantially in phase and 180 degrees out of phase with respect to the main clock signal CK, but depending on an initial value at the data input D, phases of the outputs Q and QB relative to the main clock signal CK may be reversed. Similarly, the flip-flop 223 may generate preliminary internal clock signals w90 and w270 that are substantially 90 and 270 degrees out of phase with respect to the main clock signal CK, but depending on an initial value at the data input D, phases of the outputs Q and QB relative to the main clock signal CK may be reversed.

Because phase relationships of the non-inverted and inverted outputs of the flip-flops 221 and 223 relative to the main clock signal CK may change depending on initial values of data inputs of the flip-flops 221 and 223 (e.g., when power is cycled), a phase controller 127a may be provided to translate the preliminary internal clock signals w0, w90, w180, and w270 to the primary internal clock signals W0, W90, W180, and W270. As shown in FIG. 2, the phase controller 127a may include a phase selector 131a and a phase corrector 133a. The phase selector 131a may be configured to generate a phase selection output CON responsive to combining one of the preliminary internal clock signals (such as w90) and the main clock signal CK. The phase corrector 133a may be configured to translate the preliminary internal clock signals w0, w90, w180, and w270 to the internal clock signals W0, W90, W180, and W270 responsive to the phase selection output CON.

The phase selector 131a may be configured to generate the phase selection output CON having one of first and second binary values, and the phase corrector may be configured to translate a first one of the preliminary internal clock signals (such as w0 or W180) as the primary internal clock signal WO responsive to the phase selection output CON having the first binary value. The phase corrector may be further configured to translate a second one of the preliminary internal clock signals (such as the other of w0 or w180) as the primary internal clock signal W0 responsive to the phase selection output having the second binary value. More particularly, the first and second preliminary internal clock signals (such as w0 and w180) may be inverses relative to each other.

The phase selector 131a may be configured to generate the phase selection output CON by comparing a phase of the one of the preliminary internal clock signals (such as w90) and the main clock signal CK. The phase corrector 133a may be configured to translate a first one of the preliminary internal clock signals (such as w0) or a second one of the preliminary internal clock signals (w180) as the primary internal clock signal W0 responsive to the phase selection output CON.

As shown in FIG. 2, the phase selector 131a may include a flip-flop 135a and a switch 137a (that acts responsive to MRS enable/disable signal MD generated by mode selector 123). If MRS enable/disable signal MD is at a disabled state, the switch may be configured to transfer preliminary phase selection output CON' (generated at output Q of flip-flop 135a) to phase corrector 133a as phase selection output CON. If MRS enable/disable signal MD is at an enabled state, the switch 137a may be configured to set the phase selection output CON at a logic value (such as 1 or 0) suitable for an MRS operation. According to other embodiments of the present invention, the switch 137a may be omitted so that a phase selection output generated at output Q of flip-flop 135a is provided directly to phase corrector 133a.

According to some embodiments of the present invention shown in FIG. 2, the flip-flop 135a may include a data input D configured to receive the main clock signal CK and a clock input C configured to receive the preliminary internal clock signal w90, and the phase selection output CON' may be generated at non-inverted output Q of the flip-flop 135a. According to other embodiments of the present invention, the flip-flop 135a may be arranged so that clock input C is configured to receive the main clock signal CK and so that data input D is configured to receive the preliminary internal clock signal w90, and the phase selection output is generated at an inverted output of the flip-flop. Other arrangements of the phase selector 131a and flip-flop 135a may be provided according to other embodiments of the present invention. For example, the main clock signal CK may be compared with the preliminary internal clock signal w270 with the output being taken from an inverted output of the flip-flop 135a.

The phase selector 131a may thus be configured to generate the phase selection output CON having one of first and second binary values (e.g., logic 1 and logic 0). Moreover, the phase corrector 133a may be configured to translate the preliminary internal clock signals w0, w90, w180, and w270 to the internal clock signals W0, W90, W180, and W270 according to a first translation pattern responsive to a first value of phase selection output CON. The phase corrector 133a may be configured to translate the preliminary internal clock signals w0, w90, w180, and w270 to the internal clock signals W0, W90, W180, and W270 according to a second translation pattern different than the first translation pattern responsive to a second value of the phase selection output CON.

Figure 3:
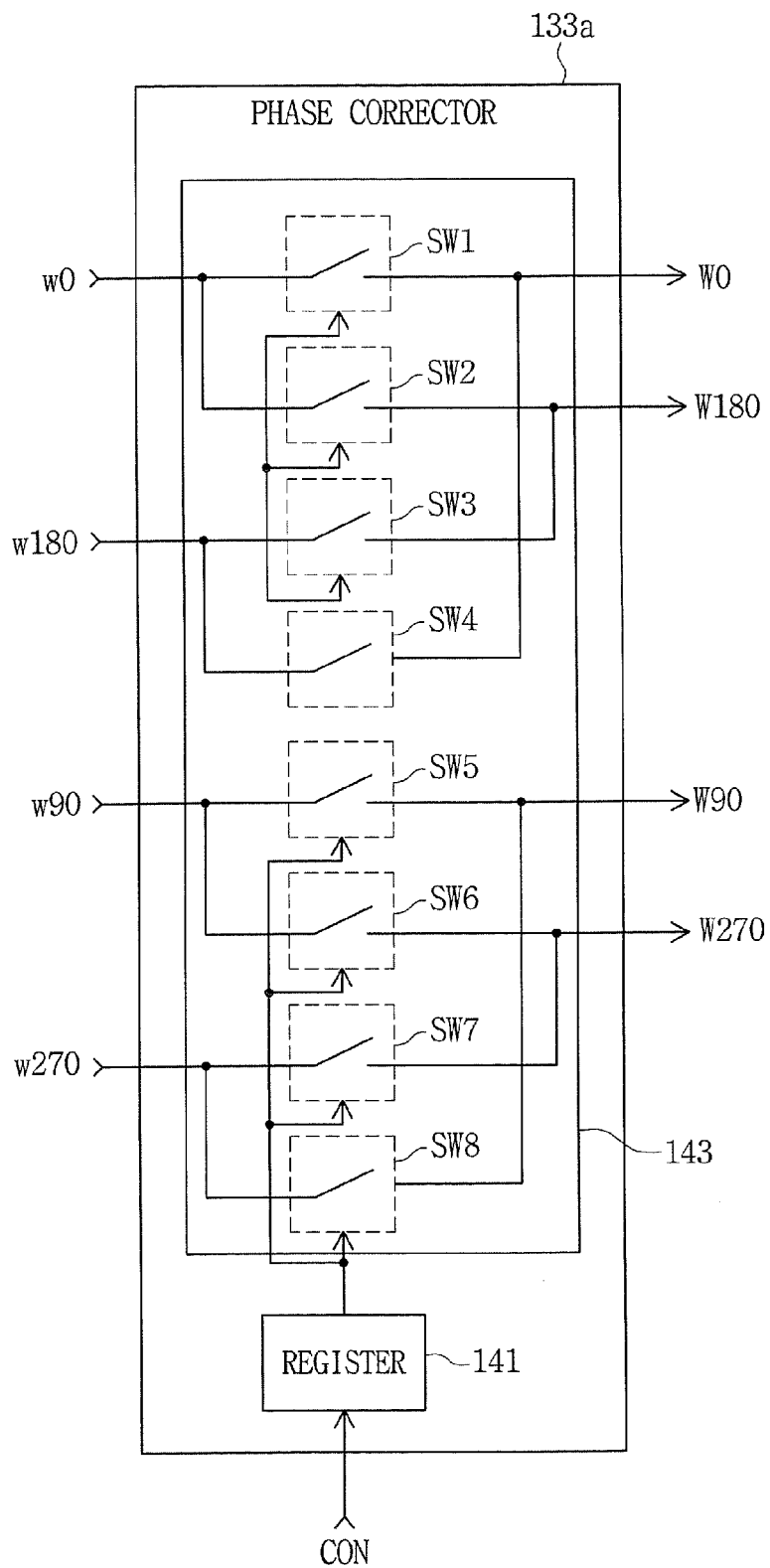
FIG. 3 is a schematic diagram illustrating a phase corrector according to some embodiments of the present invention.

FIG. 3 is a schematic diagram illustrating the phase corrector 133a of FIG. 2 according to some embodiments of the present invention. As shown in FIG. 3, the phase corrector 133a may include a register 141 and a bank of switches 143 used to perform the signal translation. The register 141 may receive the phase selection output CON from the phase selector 131a when the phase is selected, and the register 141 may then store the value of the phase selection output CON to lock the phase selection until another phase selection is requested.

The bank of switches 143 may include odd switches SW1, SW3, SW5, and SW7 and even switches SW2, SW4, SW6, and SW8. More particularly, the bank of switches 143 may be configured so that either odd switches (SW1, SW3, SW5, and SW7) are closed and even switches (SW2, SW4, SW6, and SW8) are open, or so that even switches (SW2, SW4, SW6, and SW8) are closed and odd switches (SW1, SW3, SW5, and SW7) are open. For example, the even switches may be normally open while the odd switches are normally closed; the even switches may be normally open while the odd switches are normally closed; and/or the even and odd switches may be of complimentary transistor types (e.g., PMOS and NMOS transistors). Accordingly, a same control signal can be used to control the even and odd switches. In an alternative, the even and odd switches may be of a same type (e.g., all normally open, all normally closed, all PMOS transistors, all NMOS transistors, etc.) with a control signal applied to the even switches being inverted relative to a control signal applied to the odd switches.

Figure 4A:
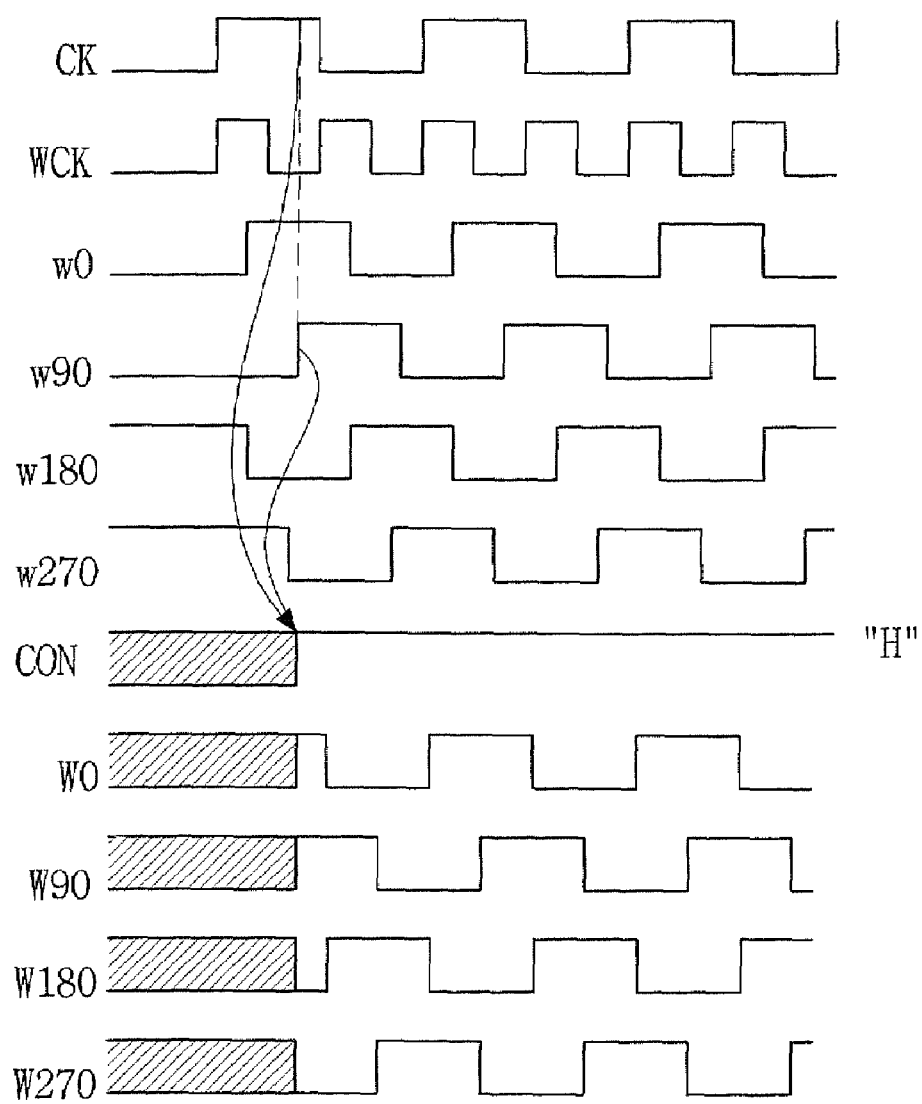
FIGS. 4A and 4B are timing diagrams illustrating operations of a frequency divider and phase controller according to some embodiments of the present invention.
Figure 4B:
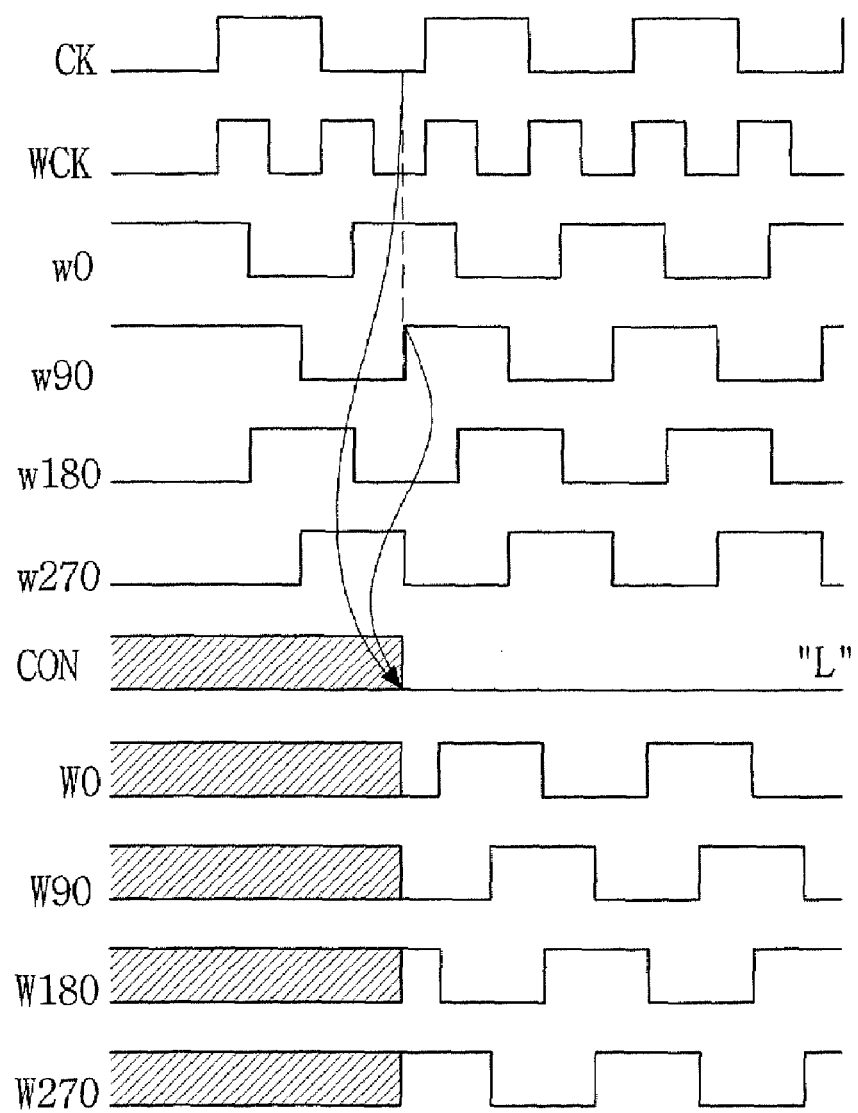

FIGS. 4A and 4B are timing diagrams illustrating operations of the frequency divider 125a and phase controller 127a of FIG. 2 and the phase corrector 133a of FIG. 3. In both of FIGS. 4A and 4B, high speed clock signal WCK has a frequency two times greater than a frequency of main clock signal CK, and the frequency divider 125a generates the preliminary internal clock signals w0, w90, w180, and w270 each having the main clock frequency. The preliminary internal clock signals w0 and w180 are about 180 degrees out of phase with respect to each other, the preliminary internal clock signals w90 and w270 are about 180 degrees out of phase with respect to each other, the preliminary internal clock signal w90 is delayed about 90 degrees relative to the preliminary internal clock signal w0, and the preliminary internal clock signal w270 is delayed about 90 degrees relative to the preliminary internal clock signal w180. Depending on initial input values of flip-flops 221 and 223 of FIG. 2, however, the preliminary internal clock signal w0 may be in phase with the main clock signal CK as shown in FIG. 4A, or the preliminary internal clock signal w0 may be 180 degrees out of phase with respect to the main clock signal CK as shown in FIG. 4B.

When the preliminary internal clock signal w0 is in phase with the main clock signal CK as shown in FIG. 4A, a comparison of the preliminary internal clock signal w90 and the main clock signal CK at flip-flop 135a will generate a phase selection output CON' having a logic value of 1. Stated in other words, the flop-flop 135a will latch a logic value of the main clock signal CK received at data input D on the rising edge of the preliminary internal clock signal w90 to generate a phase selection output CON' having the logic value of 1 which is passed to the phase corrector 133a as phase selection output CON. In response to applying the phase selection output CON having a logic value of 1 to the bank of switches 143, the odd switches SW1, SW3, SW5, and SW7 may be closed, while the even switches SW2, SW4, SW6, and SW8 may be opened. Accordingly, preliminary internal clock signal w0 may be translated as internal clock signal W0, preliminary internal clock signal w90 may be translated as internal clock signal W90, preliminary internal clock signal w180 may be translated as internal clock signal W180, and preliminary internal clock signal w270 may be translated as internal clock signal W270.

When the preliminary internal clock signal w0 is 180 degrees out of phase with respect to the main clock signal CK as shown in FIG. 4B, a comparison of the preliminary internal clock signal w90 and the main clock signal CK at flip-flop 135a will generate a phase selection output CON' having a logic value of 0. Stated in other words, the flop-flop 135a will latch a logic value of the main clock signal CK received at data input D on the rising edge of the preliminary internal clock signal w90 to generate a phase selection output CON' having the logic value of 0 which is passed to the phase corrector 133a as phase selection output CON. In response to applying the phase selection output CON having a logic value of 0 to the bank of switches 143, the even switches SW1, SW3, SW5, and SW7 may be closed, while the odd switches SW2, SW4, SW6, and SW8 may be opened. Accordingly, preliminary internal clock signal w180 may be translated as internal clock signal W0, preliminary internal clock signal w270 may be translated as internal clock signal W90, preliminary internal clock signal w0 may be translated as internal clock signal W180, and preliminary internal clock signal w90 may be translated as internal clock signal W270.

Figure 5:
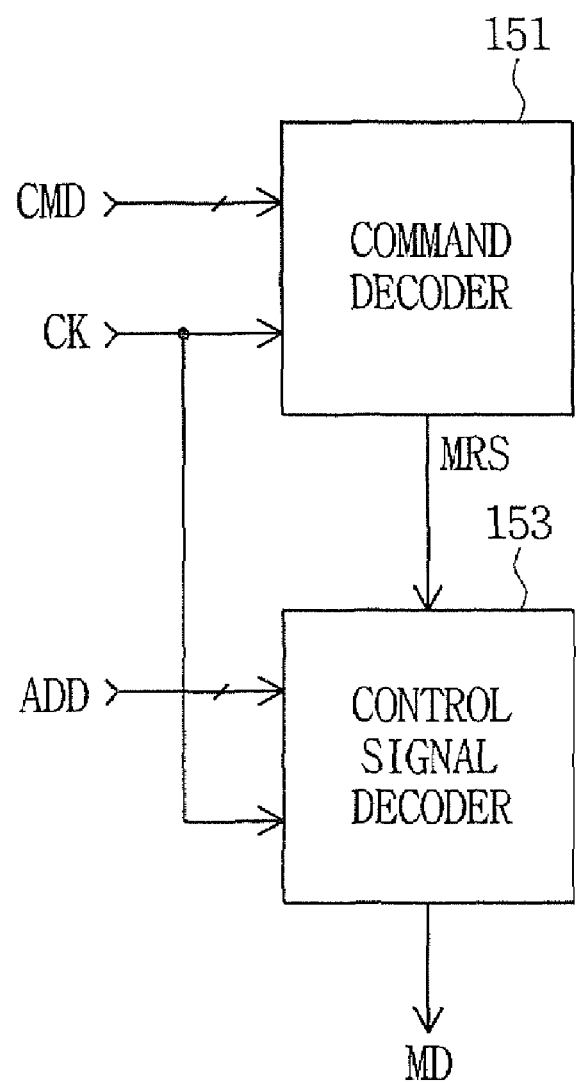
FIG. 5 is a block diagram illustrating a mode selector according to some embodiments of the present invention.

As shown in FIG. 5, the mode selector 123 of FIG. 1 may include a command decoder 151 and a control signal decoder 153. The main clock signal CK may be received at both of the command decoder 151 and the control signal decoder 153. Command information CMD may be received at the command decoder 151, and address information ADD may be received at control signal decoder 153. Responsive to the command information CMD and the main clock signal CK, the command decoder 151 may generate the mode register set command MRS signal, and the control signal decoder 153 may generate the enable/disable signal MD responsive to the MRS signal, the address information ADD, and the main clock signal CK.

In addition, phase detector 161 may be configured to generate a phase error signal EDC responsive to one of the internal clock signals (such as W0) and the main clock signal CK and to transmit the phase error signal EDC to memory controller 103 outside the integrated circuit memory device 101. The phase detector 161, for example, may compare phases of primary internal clock signal W0 and main clock signal CK to generate Up/Down information (logic H or L) as the EDC signal, an the EDC signal may be used by the high speed clock generator 109 to further synchronize the high speed clock WCK after providing phase correction using frequency divider 125 and phase controller 127.

The phase detector 161, for example, may include a flip-flop with a data input (D) configured to receive the main clock signal CK and a clock signal input (C) configured to receive primary internal clock signal W0. The flip-flop may thus latch a logic state of the clock signal CK at a rising edge of the primary internal clock signal W0, and the latched logic state may be provided at an output (Q) of the flip-flop as the EDC signal. A high EDC signal may thus indicate that the primary internal clock signal W0 is delayed relative to the main clock signal CK, and a low EDC signal may indicate that the main clock signal CK is delayed relative to the primary internal clock signal W0. The high speed clock generator 109 may provide different delays for the high speed clock signal while monitoring the resulting EDC signals, and the high speed clock generator 109 may select a delay for the high speed clock signal WCK based on a transition of the EDC signal from low to high or from high to low. In other words, in a series of increasing or decreasing delays of the high speed clock signal WCK, a delay between a delay resulting in a high EDC signal and a delay resulting in a low EDC signal may be selected by the high speed clock generator 109 for the high speed clock signal WCK.

Figure 6:
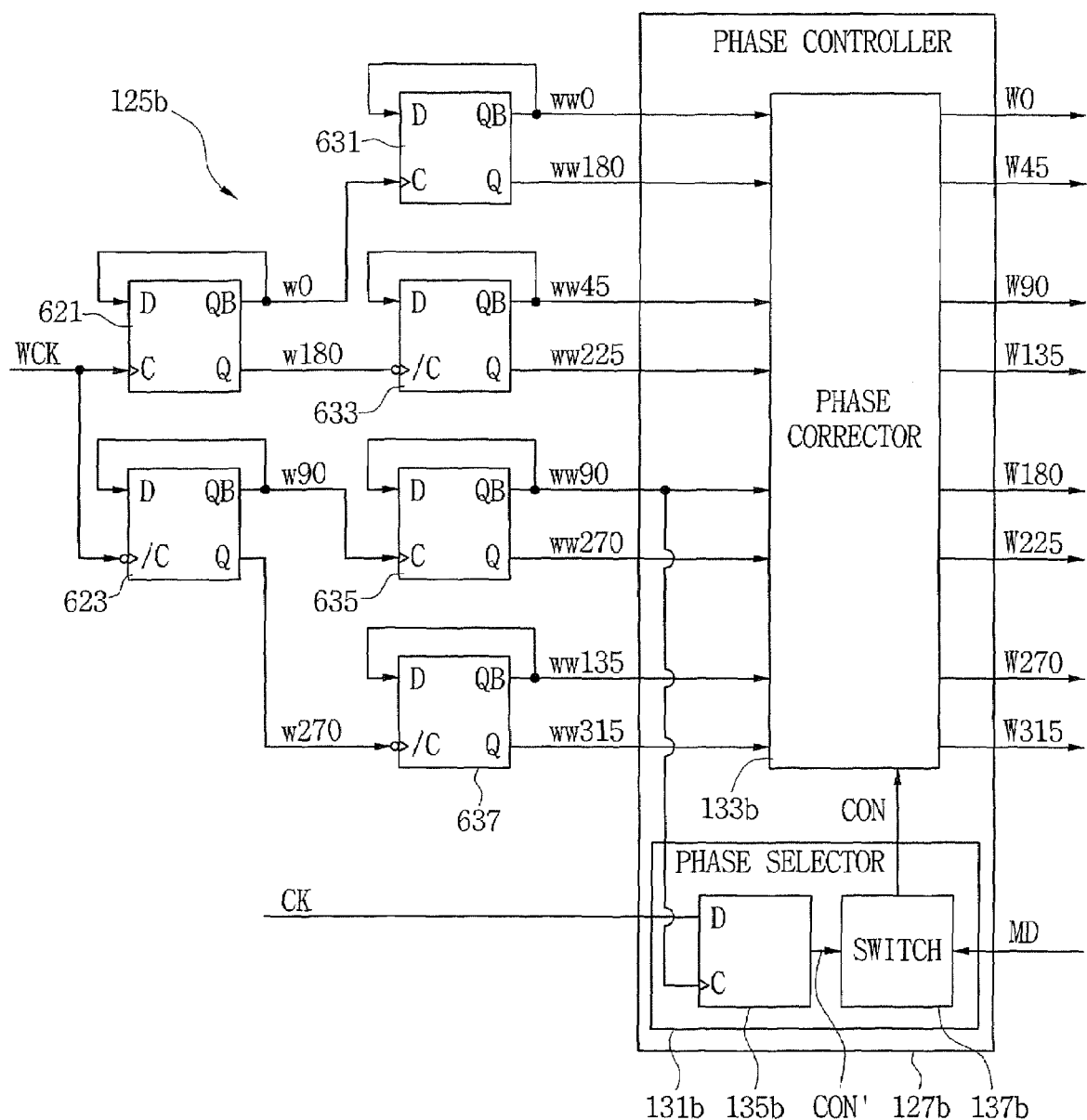
FIG. 6 is a schematic diagram illustrating a frequency divider and a phase controller according to some embodiments of the present invention.

According to still other embodiments of the present invention, frequency divider 125 may be implemented with stages of flip-flops to accommodate a high speed clock signal WCK with a frequency more than 2 times greater than a frequency of the clock signal CK. As shown in FIG. 6, a frequency divider 125b may include two stages of flip-flops with a first stage having flip-flops 621 and 623 and a second stage having flip-flops 631, 633, 635, and 637. The first stage of flip-flops may generate preliminary internal clock signals w0, w90, w180, and w270 each having a frequency that is one half the frequency of the high speed clock signal and 2 times that of the main clock signal CK. The second stage of flip-flops may generate preliminary internal clock signals ww0, ww45, ww90, ww135, ww180, ww225, ww270, and ww315 each have a frequency that is one fourth the frequency of the high speed clock signal WCK and that is the same as the frequency of the main clock signal CK.

Because initial values of flip-flop inputs are not known, a phase of the preliminary internal clock signal ww0 relative to the main clock signal CK may not be known. Accordingly, the phase selector 131b may compare the main clock signal CK and preliminary internal clock signal ww90 using flip-flop 135b as discussed above with respect to FIG. 2. An output of flip-flop 135b may be provided through switch 137b to the phase corrector 133b, and in response, the phase corrector 133b may perform phase translation to generate the internal clock signals W0, W45, W90, W135, W180, W225, W270, and W315.

While a comparison of preliminary internal clock signal ww90 and main clock signal CK is discussed by way of example, other comparisons may be performed. The main clock signal CK and preliminary clock signal ww45 may be compared using the same logic discussed above with respect to preliminary clock signal ww90. In an alternative, main clock signal CK may be compared with preliminary clock signal ww215 or ww270 using an inverted output of flip-flop 135b. Other logical comparisons such as reversing the data D and clock C inputs of the flip-flop 135b and/or using an inverted/non-inverted output are also possible.

Figure 7A:
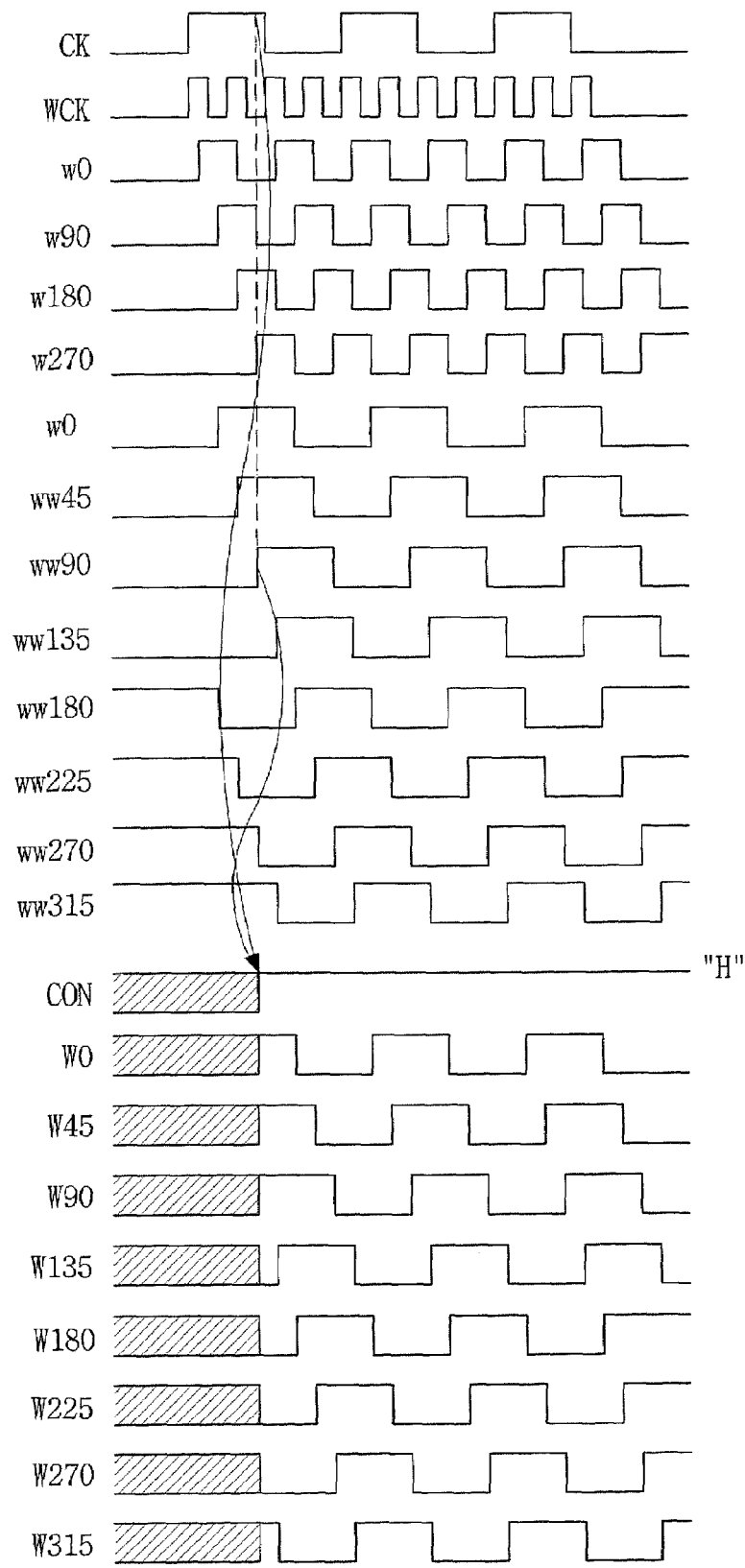
FIGS. 7A and 7B are timing diagrams illustrating operations of a frequency divider and phase controller according to some embodiments of the present invention.
Figure 7B:
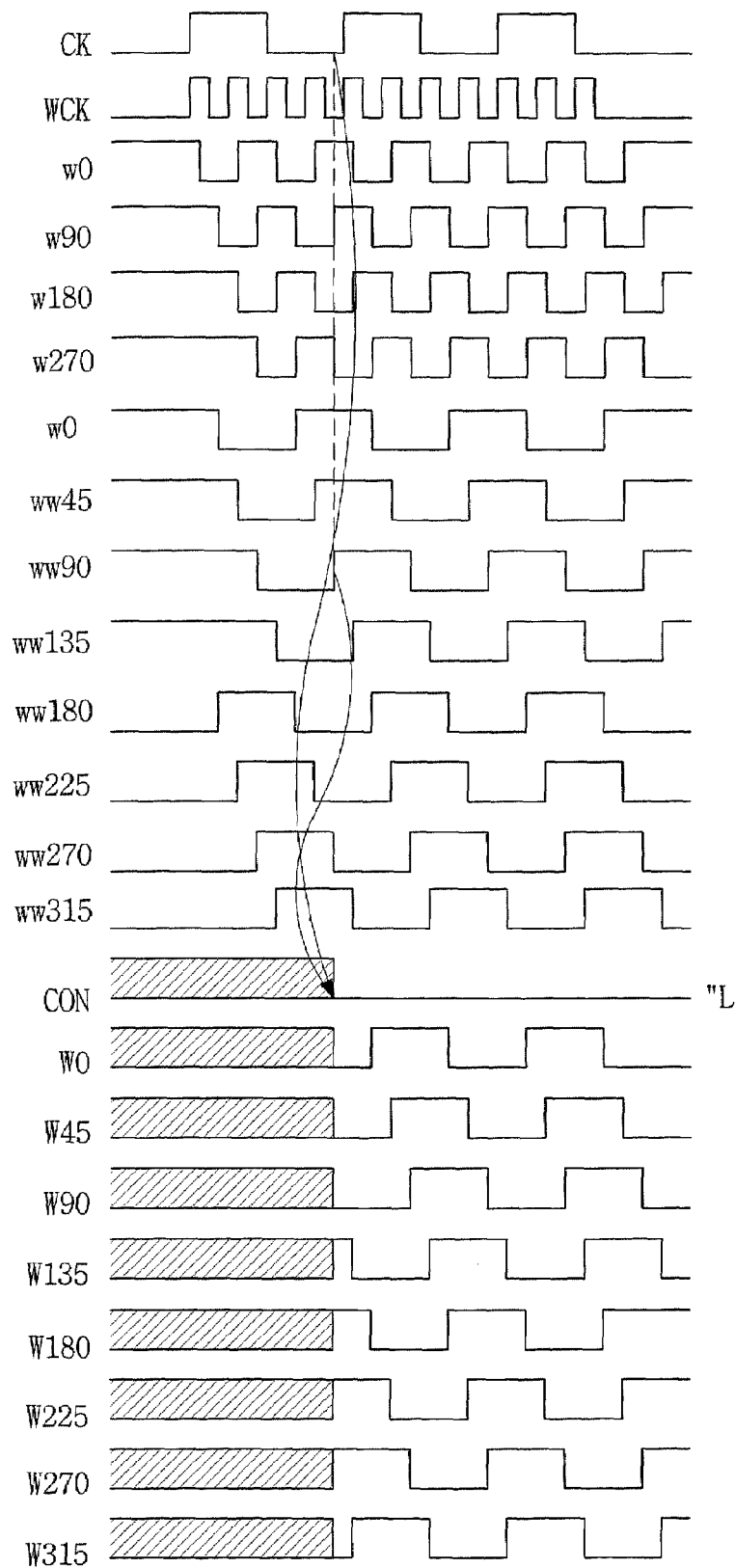

FIGS. 7A and 7B are timing diagrams illustrating operations of the frequency divider 125b and phase controller 127b of FIG. 6. In both of FIGS. 7A and 7B, high speed clock signal WCK has a frequency four times greater than a frequency of main clock signal CK, and flip-flops 621 and 623 of the frequency divider 125b generate the preliminary internal clock signals w0, w90, w180, and w270 each having a frequency two times the main clock frequency. Flip-flops 631, 633, 635, and 637 generate the preliminary internal clock signals ww0, ww45, ww90, ww135, ww180, ww225, ww270, and ww315 each having the frequency of the main clock signal CK. The preliminary internal clock signals ww0 and ww180 are about 180 degrees out of phase with respect to each other. Depending on initial input values of flip-flops of FIG. 6, however, the preliminary internal clock signal ww0 may be in phase with the main clock signal CK as shown in FIG. 7A, or the preliminary internal clock signal ww0 may be 180 degrees out of phase with respect to the main clock signal CK as shown in FIG. 7B.

When the preliminary internal clock signal ww0 is in phase with the main clock signal CK as shown in FIG. 7A, a comparison of the preliminary internal clock signal ww90 and the main clock signal CK at flip-flop 135b will generate a phase selection output CON' having a logic value of 1. Stated in other words, the flop-flop 135b will latch a logic value of the main clock signal CK received at data input D on the rising edge of the preliminary internal clock signal ww90 to generate a phase selection output CON' having the logic value of 1 which is passed to the phase corrector 133b as phase selection output CON. In response to the phase selection output CON having a logic value of 1, preliminary internal clock signal ww0 may be translated as internal clock signal W0, preliminary internal clock signal ww45 may be translated as internal clock signal W45, preliminary internal clock signal ww90 may be translated as internal clock signal W90, preliminary internal clock signal ww135 may be translated as internal clock signal W135, preliminary internal clock signal ww180 may be translated as internal clock signal W180, preliminary internal clock signal ww225 may be translated as internal clock signal W225, preliminary internal clock signal ww270 may be translated as internal clock signal W270, and preliminary internal clock signal ww315 may be translated as internal clock signal W315.

When the preliminary internal clock signal ww0 is 180 degrees out of phase with respect to the main clock signal CK as shown in FIG. 7B, a comparison of the preliminary internal clock signal ww90 and the main clock signal CK at flip-flop 135b will generate a phase selection output CON' having a logic value of 0. Stated in other words, the flop-flop 135b will latch a logic value of the main clock signal CK received at data input D on the rising edge of the preliminary internal clock signal ww90 to generate a phase selection output CON' having the logic value of 0 which is passed to the phase corrector 133b as phase selection output CON. In response to applying the phase selection output CON having a logic value of 0, preliminary internal clock signal ww180 may be translated as internal clock signal W0, preliminary internal clock signal ww225 may be translated as internal clock signal W45, preliminary internal clock signal ww270 may be translated as internal clock signal W90, preliminary internal clock signal ww315 may be translated as internal clock signal W135, preliminary internal clock signal ww0 may be translated as internal clock signal W180, preliminary internal clock signal ww145 may be translated as internal clock signal W225, preliminary internal clock signal ww90 may be translated as internal clock signal W270, and preliminary internal clock signal ww135 may be translated as internal clock signal W315.

Figure 8A:
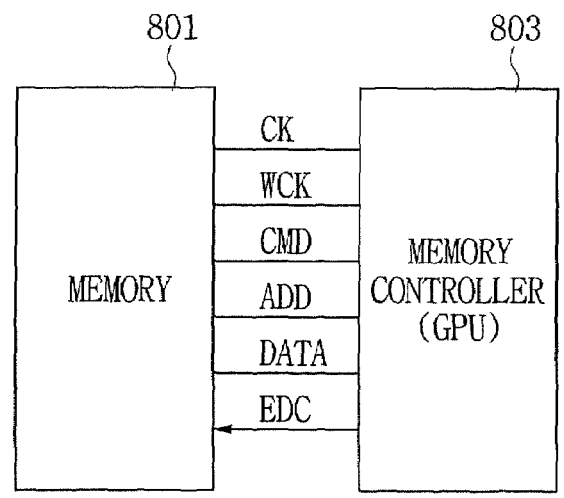
FIGS. 8A to 8D are block diagrams illustrating memory systems including memory devices and/or controllers according to embodiments of the present invention.

FIGS. 8A to 8D are block diagrams illustrating memory systems including memory devices and/or controllers according to embodiments of the present invention. As shown in FIG. 8A, a memory system may include an integrated circuit memory device 801 and a memory controller 803 implemented as discussed above with respect to memory device 101 and memory controller 103 of FIG. 1. As discussed herein, the conductive lines coupling signals such as main clock signal CK, high speed clock signal WCK, command information CMD, address information ADD, information DATA (or DQ), and/or phase error signal EDC may be collectively referred to as an interface (or I/F).

Figure 8B:
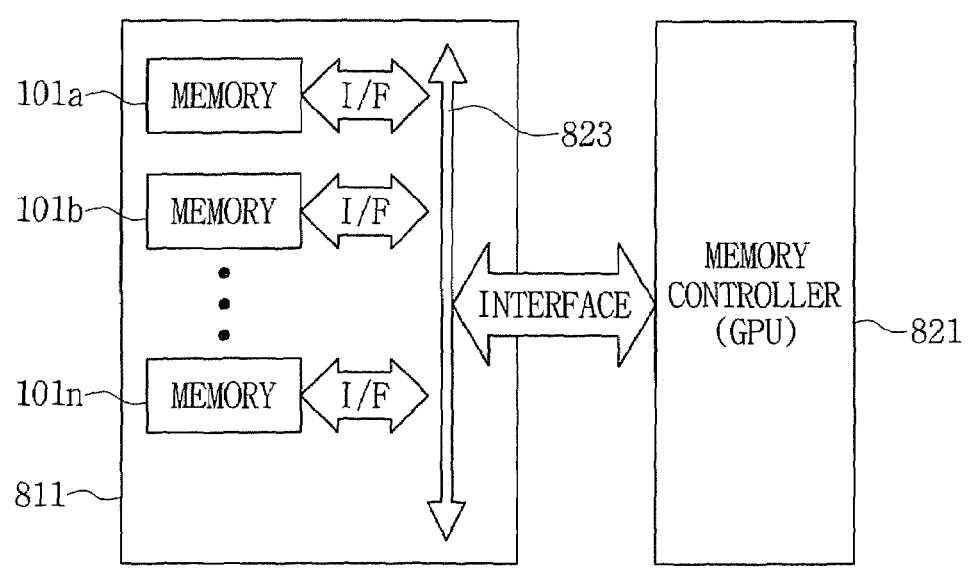

As shown in FIG. 8B, a memory module may include a plurality of memory devices 101a to 101n on a printed circuit board 811, with each of the memory devices 101a to 101n being implemented as discussed above with respect to memory device 101 of FIG. 1. Moreover each of the memory devices 101a to 101n may be coupled with memory controller 821 through an interface including a common bus 823. The memory controller 821 may perform functionalities discussed above with respect to memory controller 103 of FIG. 1.

Figure 8C:
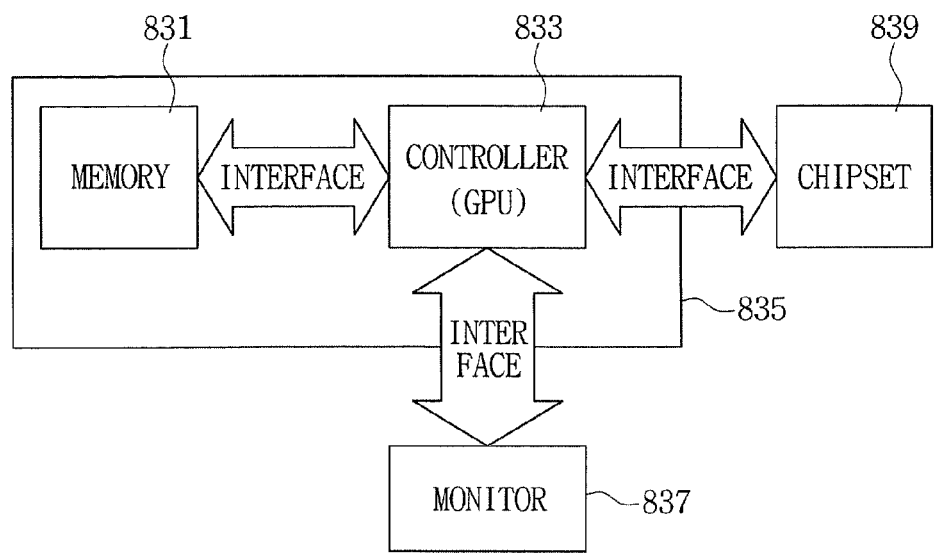

As shown in FIG. 8C, a graphics card may include a memory device 831 and a controller 833 on a printed circuit board 835, with the memory device 831 being implemented as discussed above with respect to memory device 101 of FIG. 1 and/or the memory device may be implemented as a module of memory devices 101a to 101n as discussed above with respect to FIG. 8B. The controller 833 may perform graphics processing to render graphics on monitor 837 responsive to instructions received from chipset 839. The controller 833 may also interface with memory 831 using functionalities discussed above with respect to the memory controller 103 of FIG. 1 to facilitate graphics processing.

Figure 8D:
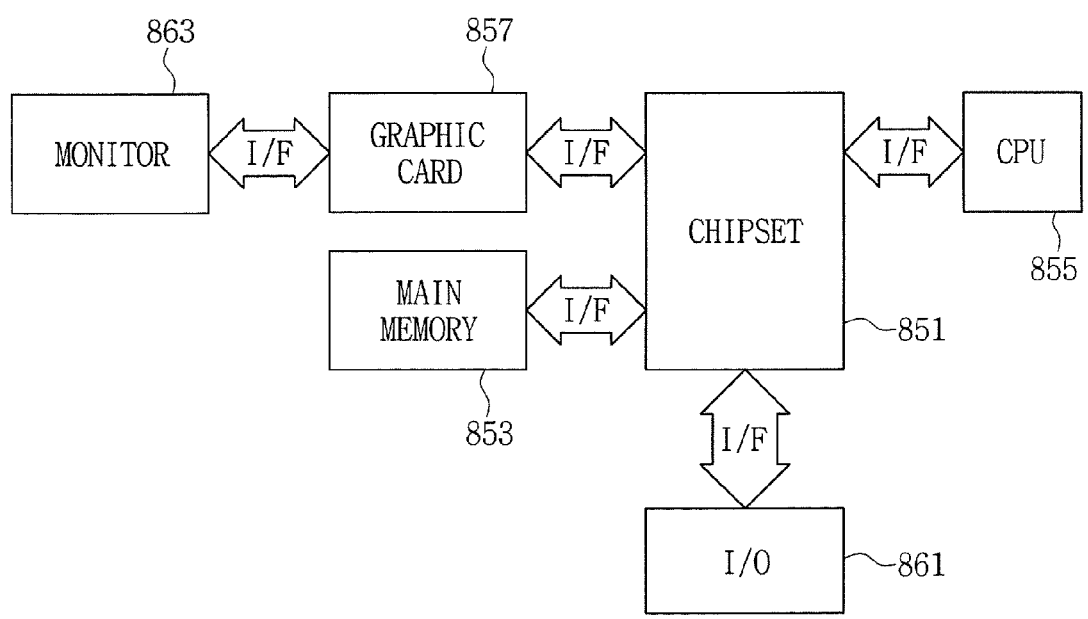

As shown in FIG. 8D, a computer may be implemented using a chipset 851 coupled to a main memory 853 including one or more memory devices implemented as discussed above with respect to memory device 101 of FIG. 1 and/or as discussed above with respect to the module including memory devices 101a to 101n of FIG. 8B. The chipset may provide an interface between a central processing unit 855, a graphics card 857, and an input/output device 861 (such as a keyboard). The graphics card may be used to render graphics on monitor 863 as discussed above with respect to FIG. 8C. Moreover, memory controller functionality may be provided by chipset 851 and/or central processing unit 855 interfacing with main memory 853.

By using a frequency divider and phase controller according to embodiments of the present invention, synchronization between high speed and main clock signals may be provided without requiring data training. Accordingly, time required to synchronize clock signals may be reduced when the memory device is powered up, for example, after wakeup from power down or self refresh or during/after a low frequency test operation. Moreover, power/current consumption may be reduced because no write operations are required.

While the present invention has been particularly shown and described with reference to embodiments thereof, it will be understood by those of ordinary skill in the art that various changes in form and details may be made therein without departing from the spirit and scope of the present invention as defined by the following claims.

That which is claimed is:

1. An integrated circuit device comprising:
   a main clock signal input pad configured to receive a main clock signal having a main clock frequency, wherein the main clock signal input pad is configured to receive the main clock signal from outside the integrated circuit device;
   a high speed clock signal input pad configured to receive a high speed clock signal having a high speed clock frequency greater than the main clock frequency, wherein the high speed clock signal input pad is configured to receive the high speed clock signal from outside the integrated circuit device;
   a frequency divider configured to generate a plurality of preliminary internal clock signals responsive to the high speed clock signal received from outside the integrated circuit device wherein each of the preliminary internal clock signals has the same main clock frequency and a different phase; and
   a phase controller configured to select one of the preliminary internal clock signals having a phase most closely matched with a phase of the main clock signal received from outside the integrated circuit device, and configured to translate the preliminary internal clock signals to internal clock signals so that the preliminary internal clock signal having the phase most closely matched with the phase of the main clock signal is translated as a primary internal clock signal, so that the internal clock signals have the main clock frequency.

2. An integrated circuit device according to claim 1 wherein the primary internal clock signal has a primary phase, and non-primary ones of the internal clock signals have different phases that are delayed relative to the primary phase.

3. An integrated circuit device according to claim 1 wherein the main clock input pad is configured to received the main clock signal from a memory controller outside the integrated circuit device, and wherein the high speed clock signal input pad is configured to receive the high speed clock signal from the memory controller outside the integrated circuit device, the integrated circuit device further comprising:
   a memory cell array including a plurality of memory cells; and
   a plurality of data input/output buffers coupled between respective data input/output pads and the memory cell array, wherein each of the data input/output buffers is configured to write and/or read data to and/or from the memory cell array responsive to the plurality of internal clock signals, wherein the data input/output pads are configured to communicate the data between the plurality of data input/output buffers and the memory controller outside the integrated circuit device.

4. An integrated circuit device according to claim 1 wherein the high speed clock frequency is $2^n$ times greater than the main clock frequency where n is a positive integer number.

5. An integrated circuit device according to claim 1 wherein the frequency divider includes:
   a first flip-flop having a data input, a clock input, and inverted and non-inverted data outputs and configured to receive the high speed clock signal at the clock input and to feed the inverted data output back to the data input; and
   a second flip-flop having a data input, an inverted clock input, and inverted and non-inverted data outputs and configured to receive the high speed clock signal at the inverted clock input and to feed the inverted data output back to the data input wherein the preliminary internal clock signals are generated at the inverted and non-inverted data outputs of the first and second flip-flops.

6. An integrated circuit device according to claim 1 wherein the frequency divider is configured to generate $2^m$ preliminary internal clock signals with each of the $2^m$ preliminary internal clock signals having the same main clock frequency and a different phase, wherein a difference between a phase of each of the $2^m$ preliminary internal clock signals and a phase of any other of the $2^m$ preliminary internal clock signals is at least $\frac{1}{2}^m$ of a period of the main clock frequency where m is a positive integer number.

7. An integrated circuit device according to claim 1 wherein the phase controller includes:
   a phase selector configured to generate a phase selection output responsive to combining one of the preliminary internal clock signals and the main clock signal; and
   a phase corrector configured to translate the preliminary internal clock signals to the internal clock signals responsive to the phase selection output.

8. An integrated circuit device according to claim 7 wherein the phase selector is configured to generate the phase selection output having one of first and second binary values, wherein the phase corrector is configured to translate a first one of the preliminary internal clock signals as the primary internal clock signal responsive to the phase selection output having the first binary value, wherein the phase corrector is configured to translate a second one of the preliminary internal clock signals as the primary internal clock signal responsive to the phase selection output having the second binary value, and wherein the second preliminary internal clock signal is an inverse of the first preliminary internal clock signal.

9. An integrated circuit device according to claim 7 wherein the phase selector is configured to generate the phase selection output by comparing a phase of the one of the preliminary internal clock signals and the main clock signal, wherein the phase corrector is configured to translate a first one of the preliminary internal clock signals or a second one of the preliminary internal clock signals as the primary internal clock signal responsive to the phase selection output, wherein the second one of the preliminary internal clock signals is an inverse of the first one of the preliminary internal clock signals.

10. An integrated circuit device according to claim 7 wherein the phase selector comprises a flip-flop having a clock input configured to receive the main clock signal and a data input configured to receive the one of the preliminary internal clock signals and wherein the phase selection output is generated at an output of the flip-flop.

11. An integrated circuit device according to claim 7 wherein the phase selector is configured to generate the phase selection output having one of first and second binary values, and wherein the phase corrector is configured to translate the preliminary internal clock signals to the internal clock signals according to a first translation pattern and to translate the preliminary internal clock signals to the internal clock signals according to a second translation pattern, wherein the first and second translation patterns are different.

12. An integrated circuit device according to claim 1 further comprising:
   a phase detector configured to generate a phase error signal responsive to one of the internal clock signals and the main clock signal received from outside the integrated circuit device and to transmit the phase error signal to a memory controller outside the integrated circuit device.

13. An integrated circuit device comprising:
   a main clock signal input pad configured to receive a main clock signal having a main clock frequency, wherein the main clock signal input pad is configured to receive the main clock signal from outside the integrated circuit device;
   a high speed clock signal input pad configured to receive a high speed clock signal having a high speed clock frequency greater than the main clock frequency, wherein the high speed clock signal input pad is configured to receive the high speed clock signal from outside the integrated circuit device;
   a frequency divider configured to generate a plurality of preliminary internal clock signals responsive to the high speed clock signal received from outside the integrated circuit device wherein each of the preliminary internal clock signals has the same main clock frequency and a different phase;
   a phase selector configured to generate a phase selection output responsive to combining one of the preliminary internal clock signals and the main clock signal received from outside the integrated circuit device; and
   a phase corrector configured to translate the preliminary internal clock signals to internal clock signals responsive to the phase selection output.

14. An integrated circuit device according to claim 13 wherein the phase selector is configured to generate the phase selection output having one of first and second binary values, wherein the phase corrector is configured to translate a first one of the preliminary internal clock signals as the primary internal clock signal responsive to the phase selection output having the first binary value, wherein the phase corrector is configured to translate a second one of the preliminary internal clock signals as the primary internal clock signal responsive to the phase selection output having the second binary value, and wherein the second preliminary internal clock signal is an inverse of the first preliminary internal clock signal.

15. An integrated circuit device according to claim 13 wherein the phase selector is configured to generate the phase selection output by comparing a phase of the one of the preliminary internal clock signals and the main clock signal, wherein the phase corrector is configured to translate a first one of the preliminary internal clock signals or a second one of the preliminary internal clock signals as the primary internal clock signal responsive to the phase selection output, wherein the second one of the preliminary internal clock signals is an inverse of the first one of the preliminary internal clock signals.

16. An integrated circuit device according to claim 13 wherein the main clock signal input pad is configured to receive the main clock signal from a memory controller outside the integrated circuit device, and wherein the high speed clock signal input pad is configured to receive the high speed clock signal from the memory controller outside the integrated circuit device, the integrated circuit device further comprising:
   a memory cell array including a plurality of memory cells; and
   a plurality of data input/output buffers coupled between respective data input/output pads and the memory cell array, wherein each of the data input/output buffers is configured to write and/or read data to and/or from the memory cell array responsive to the plurality of internal clock signals, wherein the data input/output pads are configured to communicate the data between the plurality of data input/output buffers and the memory controller outside the integrated circuit device.

17. An integrated circuit device according to claim 13 wherein the main clock signal input pad is configured to receive the main clock signal from a memory controller outside the integrated circuit device, and wherein the high speed clock signal input pad is configured to receive the high speed clock signal from the memory controller outside the integrated circuit device, the integrated circuit device further comprising:
   a phase detector configured to generate a phase error signal responsive to one of the internal clock signals and the main clock signal received from the memory controller outside the integrated circuit device and to transmit the phase error signal to the memory controller outside the integrated circuit device.

18. A memory system comprising:
   a memory controller configured to generate a main clock signal having a main clock frequency and a high speed clock signal having a high speed clock frequency greater than the main clock frequency; and
   an integrated circuit memory device coupled to the memory controller wherein the memory controller is outside the integrated circuit memory device, the integrated circuit memory device including,
      a main clock signal input pad configured to receive the main clock signal from the memory controller outside the integrated circuit memory device,
      a high speed clock signal input pad configured to receive the high speed clock signal from the memory controller outside the integrated circuit memory device,
      a memory cell array including a plurality of memory cells,
      a plurality of data input/output buffers coupled between respective data input/output pads and the memory cell array, wherein each of the data input/output buffers is configured to write and/or read data to and/or from the memory cell array responsive to a plurality of internal clock signals, wherein each of the internal clock signals has the main clock frequency, wherein a primary one of the internal clock signals has a primary phase, and wherein non-primary ones of the internal clock signals have different phases that are delayed relative to the primary phase, wherein the data input/output pads are configured to communicate the data between the plurality of data input/output buffers and the memory controller outside the integrated circuit device,
      a frequency divider configured to generate a plurality of preliminary internal clock signals responsive to the high speed clock signal received from the memory controller outside the integrated circuit memory device wherein each of the preliminary internal clock signals has the same main clock frequency and a different phase, and
      a phase controller configured to select one of the preliminary internal clock signals having a phase most closely matched with a phase of the main clock signal received from the memory controller outside the integrated circuit memory device, and configured to translate the preliminary internal clock signals to the internal clock signals so that the preliminary internal clock signal having the phase most closely matched with the phase of the main clock signal is translated as the primary internal clock signal.

19. A method of operating an integrated circuit device, the method comprising:
   receiving a main clock signal having a main clock frequency, wherein the main clock signal is received from outside the integrated circuit device;
   receiving a high speed clock signal having a high speed clock frequency greater than the main clock frequency, wherein the high speed clock signal is received from outside the integrated circuit device;
   generating a plurality of preliminary internal clock signals responsive to the high speed clock signal received from outside the integrated circuit device wherein each of the preliminary internal clock signals has the same main clock frequency and a different phase;
   selecting one of the preliminary internal clock signals having a phase most closely matched with a phase of the main clock signal received from outside the integrated circuit device; and
   translating the preliminary internal clock signals to internal clock signals so that the preliminary internal clock signal having the phase most closely matched with the phase of the main clock signal is translated as a primary internal clock signal.

20. A method of operating an integrated circuit device, the method comprising:
   receiving a main clock signal having a main clock frequency, wherein the main clock signal is received from outside the integrated circuit device;
   receiving a high speed clock signal having a high speed clock frequency greater than the main clock frequency, wherein the high speed clock signal is received from outside the integrated circuit device;
   generating a plurality of preliminary internal clock signals responsive to the high speed clock signal received from outside the integrated circuit device wherein each of the preliminary internal clock signals has the same main clock frequency and a different phase;
   generating a phase selection output responsive to combining one of the preliminary internal clock signals and the main clock signal received from outside the integrated circuit device; and
   translating the preliminary internal clock signals to internal clock signals responsive to the phase selection output.

21. An integrated circuit device comprising:
   a main clock signal input pad configured to receive a main clock signal having a main clock frequency, wherein the main clock signal input pad is configured to receive the main clock signal from outside the integrated circuit device;
   a high speed clock signal input pad configured to receive a high speed clock signal having a high speed clock frequency greater than the main clock frequency, wherein the high speed clock signal input pad is configured to receive the high speed clock signal from outside the integrated circuit device;
   a frequency divider configured to generate a plurality of preliminary internal clock signals responsive to the high speed clock signal received from outside the integrated circuit device wherein each of the preliminary internal clock signals has the same main clock frequency and a different phase; and
   a phase controller configured to select one of the preliminary internal clock signals having a phase most closely matched with an inverse of the main clock signal received from outside the integrated circuit device, and configured to translate the preliminary internal clock signals to internal clock signals so that the preliminary internal clock signal having the phase most closely matched with the inverse of the main clock signal is translated as a primary internal clock signal, so that the internal clock signals have the main clock frequency.

22. An integrated circuit device according to claim 21 further comprising:
a phase detector configured to generate a phase error signal responsive to one of the internal clock signals and the main clock signal received from outside the integrated circuit device and to transmit the phase error signal to a memory controller outside the integrated circuit device.

23. An integrated circuit device comprising:
a main clock signal input pad configured to receive a main clock signal having a main clock frequency, wherein the main clock signal input pad is configured to receive the main clock signal from outside the integrated circuit device;
a high speed clock signal input pad configured to receive a high speed clock signal having a high speed clock frequency greater than the main clock frequency, wherein the high speed clock signal input pad is configured to receive the high speed clock signal from outside the integrated circuit device;
a frequency divider configured to generate a plurality of preliminary internal clock signals responsive to the high speed clock signal received from outside the integrated circuit device wherein each of the preliminary internal clock signals has the same main clock frequency and a different phase;
a phase controller configured to select one of the preliminary internal clock signals having a phase most closely matched with a phase of the main clock signal received from outside the integrated circuit device, and configured to translate the preliminary internal clock signals to internal clock signals so that the preliminary internal clock signal having the phase most closely matched with the phase of the main clock signal is translated as a primary internal clock signal, so that the internal clock signals have the main clock frequency; and
a phase detector configured to generate a phase error signal responsive to one of the internal clock signals and the main clock signal received from outside the integrated circuit device and to transmit the phase error signal to a memory controller outside the integrated circuit device.

* * * * *